(12) United States Patent
Fleischman (10) Patent No.: US 6,439,156 B1
(45) Date of Patent: Aug. 27, 2002

(54) MILKING VACUUM FLUCTUATION FILTER

(75) Inventor: Christopher J. Fleischman, McFarland, WI (US)

(73) Assignee: DEC International, Inc., Madison, WI (US)

( * ) Notice: Subject to any disclaimer, the term of this patent is extended or adjusted under 35 U.S.C. 154(b) by 0 days.

(21) Appl. No.: 09/711,708

(22) Filed: Nov. 13, 2000

(51) Int. Cl.[7] .................................................. A01J 5/04
(52) U.S. Cl. ................................. 119/14.33; 119/14.01; 119/14.24; 119/14.47
(58) Field of Search ........................... 119/14.01–14.55; 138/26; 417/540; 137/103, 205

(56) References Cited

U.S. PATENT DOCUMENTS

| | | | | |
|---|---|---|---|---|
| 756,245 | A | * 4/1904 | Lawrence et al. | |
| 3,672,398 | A | * 6/1972 | Ichryu et al. | 137/586 |
| 4,340,079 | A | * 7/1982 | Smith et al. | 137/207 |
| 4,530,307 | A | 7/1985 | Thompson | |
| 4,537,152 | A | 8/1985 | Thompson | |
| 4,612,089 | A | * 9/1986 | Hauptmann | 162/336 |
| 5,178,095 | A | 1/1993 | Mein | |
| 5,218,924 | A | 6/1993 | Thompson et al. | |
| 5,284,180 | A | * 2/1994 | Guo et al. | 137/488 |
| 5,720,236 | A | 2/1998 | Carrano et al. | |
| 5,860,388 | A | * 1/1999 | Tan et al. | 119/14.44 |
| 5,896,827 | A | * 4/1999 | Brown | 110/14.02 |
| 5,960,738 | A | 10/1999 | Sanford | |
| 6,039,001 | A | 3/2000 | Sanford | |

* cited by examiner

Primary Examiner—Peter M. Poon
Assistant Examiner—Andrea M. Valenti
(74) Attorney, Agent, or Firm—Andrus, Sceales, Starke & Sawall, LLP (57) ABSTRACT

A milking system for milking a mammal such as a cow includes a source of vacuum applying vacuum through a conduit system to a plurality of milking clusters, each cluster having a plurality of teat cups supplying milk to a claw in response to pulsation vacuum controlled by a pulsator in the conduit system. The conduit system has a first portion upstream of the pulsator and applying vacuum from the source of vacuum to the pulsator. The conduit system has a second portion downstream of the pulsator and applying pulsation vacuum to the teat cups. The vacuum in the upstream portion of the conduit system is subject to fluctuation due to pulsation vacuum in the downstream portion. A vacuum fluctuation suppression filter is provided in the upstream portion of the conduit system attenuating the noted vacuum fluctuation.

30 Claims, 3 Drawing Sheets

FIG. 8

MILKING VACUUM FLUCTUATION FILTER

BACKGROUND AND SUMMARY

The invention relates to a milking system for milking mammals, including cows.

Milking systems withdraw milk from the milk secreting glands of mammals by applying negative pressure (pressure below atmospheric pressure), i.e. vacuum, to the teat. A plurality of teat cups are provided, each having a liner, or inflation, around a respective teat, and defining a milk flow passage within the liner below the teat, and a pulsation chamber outside the liner between the liner and the teat cup. The milk flow passage within the liner supplies milk to a milking claw which also receives milk from milk flow passages of other liners of other teat cups. The milking cluster provided by the teat cups and claw supplies the milk to a collection container which also receives milk from other clusters attached to respective other cows in the milking parlor.

Simply applying a constant vacuum to the teat is not desirable because it causes the tissue of the teat to become engorged with blood and lymph. When these fluids are confined to their normal spaces within the teat, the condition is called congestion. When the fluids leave their normal spaces, it is called odema. These conditions may result in pain or discomfort to the mammal being milked, and swelling of the tissue which may constrict the duct through which milk is being withdrawn, thereby slowing the flow of milk. The slowing of milk flow due to the effects of congestion may be accompanied by a reduced volume of milk available for removal because the discomfort may interfere with the milk ejection reflex by which the mammal presents her milk to the teat.

Various attempts have been made to ameliorate the undesirable effects of vacuum on the teat by carefully shaping the teat cup and liner to support the teat as well as possible, and by periodically relieving the vacuum to the teat. The liner periodically collapses around and below the teat, providing massage to the teat. The massage compresses the end of the teat, thereby actively forcing fluids out of the teat apex. The massaging action of the liner also provides stimulation to the teat whereby the milk ejection reflex is strengthened. In some cases, the milk ejection reflex may be elicited solely by the action of the pulsating liner. The pulsation cycle has an on portion and an off portion. Milk is withdrawn from the teat through the liner to the claw during the on portion. During the off portion, the closed liner stops milk flow from the teat. A pulsator alternates between a first condition connecting a negative pressure source, i.e. vacuum, to the pulsation chamber, and a second condition applying atmospheric or higher pressure to the pulsation chamber. The pulsation valve provides a pulsation cycle having an on portion during the first condition of the valve, and an off portion during the second condition of the valve.

The milking system includes a source of vacuum applying vacuum through a conduit system to a plurality of milking clusters, each cluster having a plurality of teat cups supplying milk to a claw in response to pulsation vacuum controlled by a pulsator in the conduit system. The conduit system has a first portion upstream of the pulsator and applying vacuum from the source of vacuum to the pulsator. The conduit system has a second portion downstream of the pulsator and applying pulsation vacuum to the teat cups. The vacuum in the first upstream portion of the conduit system is subject to fluctuation due to the pulsation vacuum in the second downstream portion of the conduit system. The present invention suppresses the vacuum fluctuation in the upstream portion of the conduit system.

BRIEF DESCRIPTION OF THE DRAWINGS

Prior Art

Present Invention

DETAILED DESCRIPTION

Prior Art

Figures 1, 2:
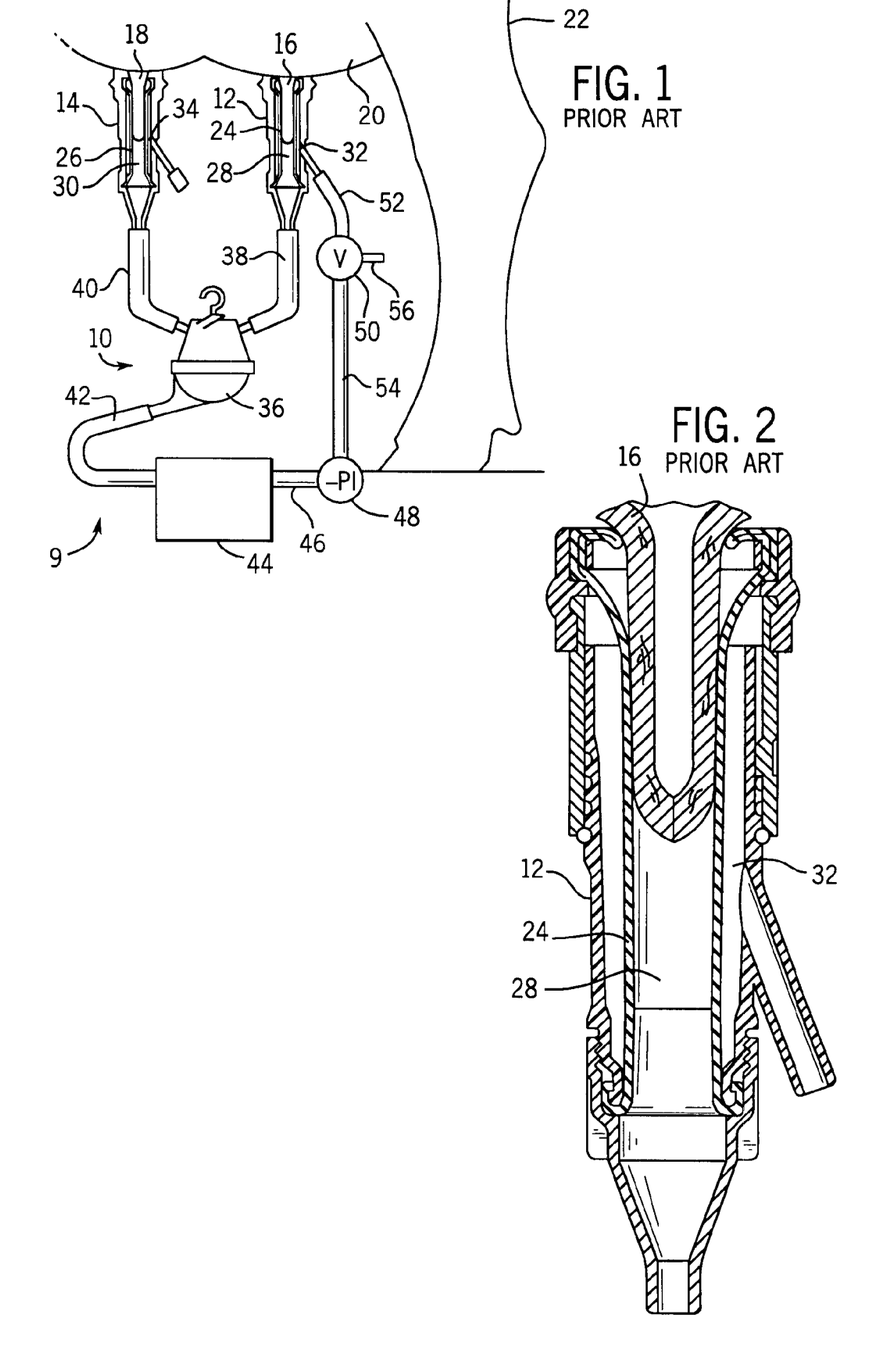
FIG. 1 is taken from FIG. 1 of U.S. Pat. No. 5,178,095 and schematically illustrates a milking system known in the prior art.
FIG. 2 is taken from FIG. 2 of the '095 patent and shows a teat cup and line during the on portion of a milking cycle as known in the prior art.

The description relative to FIGS. 1 and 2 is taken from U.S. Pat. No. 5,178,095, incorporated herein by reference. FIG. 1 shows a milking system 9 including a milking cluster 10 having a plurality of teat cups such as 12, 14 connected to respective teats such as 16, 18 depending from the udder 20 of a mammal 22 such as a cow. Each teat cup has a liner or inflation such as 24, 26 around a respective teat and defining a milk flow passage such as 28, 30 within the liner below the teat, and a pulsation chamber such as 32, 34 outside the liner between the liner and the teat cup. The teat cup and liner are shown and described in U.S. Pat. No. 4,530,307, incorporated herein by reference. A milking claw 36, for example as shown in U.S. Pat. No. 4,537,152, incorporated herein by reference, has a plurality of inlets receiving milk through tubes such as 38, 40 connected to respective teat cups to receive milk from respective milk flow passages such as 28, 30. The claw has a discharge tube 42 connected to milk collection container 44 having a vacuum connection tube 46 connected to a source of negative pressure 48. Negative pressure source 48 applies substantially constant negative pressure (vacuum), relative to atmospheric pressure, through claw 36 to milk flow passages 28, 30.

The system has a milking cycle with an on portion and an off portion. Milk flows from the teat towards claw 36 during the on portion. A pulsator 50 is connected to each of the teat cups at a connection tube such as 52 and has first and second conditions alternately and cyclically connecting the teat cup to the negative pressure source 48 through connection tube 54 during the on portion of the milking cycle, and connecting the teat cup to atmosphere through connection tube 56 during the off portion of the milking cycle. It is also known in the prior art to connect the teat cup to a source of positive pressure, relative to atmospheric pressure, during the off portion of the milking cycle, e.g. by supplying connection tube 56 with a source of positive pressure. During the off portion of the milking cycle, the positive pressure or atmospheric pressure applied through connection tube 56, pulsator 50, and connection tube 52 to pulsation chamber 32 of teat cup 12 collapses and closes liner 24 below teat 16 to block milk flow, and to relieve the teat from the negative pressure applied from vacuum source 48 through connection tube 46, container 44, connection tube 42, claw 36, and connection tube 38 to milk flow passage 28 at the lower end of liner 24. During the on portion of the milking cycle, vacuum from source 48 is applied through connection tube 54, pulsator 50, and connection tube 52 to pulsation chamber 32 of teat cup 12, such that liner 24 opens to its normally open position and milk is withdrawn from teat 16.

Figure 3:
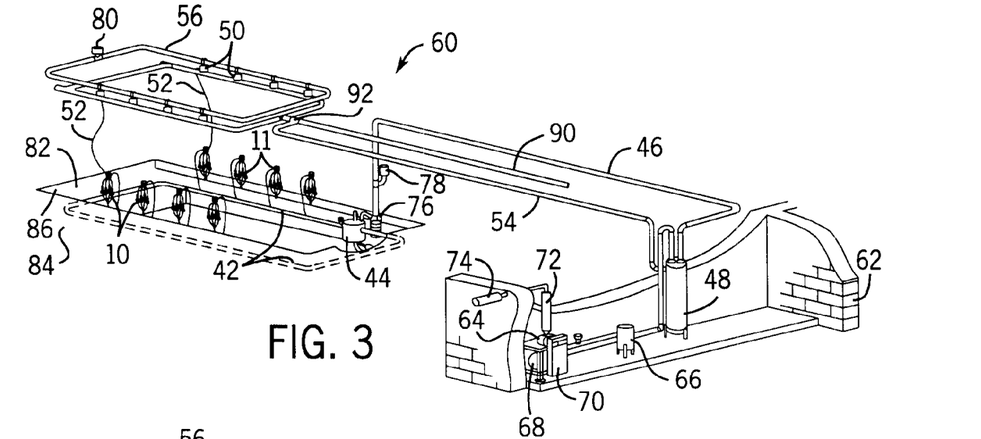
FIG. 3 is a schematic illustration of a milking system in accordance with the invention.

Referring to the portion of FIG. 3 known in the prior art, a milking system 60 is provided in milking parlor or building 62. Vacuum pump 64 applies vacuum through vacuum filter 66 to a vacuum distribution tank 48 providing the above noted vacuum source. Pump 64 is driven by an electric motor 68 by a belt (not shown) covered by belt guard 70. The noise from pump 64 is quieted by mufflers 72 and 74. Vacuum distribution tank 48 applies vacuum through vacuum line 46 and sanitary trap 76 to receiver or container 44, as above noted, as regulated by regulator 78. Vacuum distribution tank 48 also applies vacuum through vacuum line 54, pulsators 50, and pulsation vacuum lines 52 (only two of which are shown), to respective teat cups of respective milking clusters 10. The noted connection to atmosphere for the pulsators is provided through the noted connection tube 56 and filter 80. Each cluster 10 includes milking claw 36, FIG. 1, and four teat cups such as 12, 14, etc. Clusters 10 are shown in milking pit 82 of the parlor which is recessed below floor 84 which supports the cows. The edge of the floor is shown at 86 which defines the perimeter of pit 82. Milk from claws 36 of the clusters flows through milk line 42 to collection container 44. Milking system 60 includes vacuum source 48,64 applying vacuum through a conduit system 46 54, 52 to a plurality of milking clusters 10, each cluster having a plurality of teat cups, 12, 14, etc. supplying milk to a respective claw 36 in response to pulsation vacuum controlled by a pulsator 50 in the conduit system. The conduit system has a first portion 54 upstream of the pulsator 50 and applying vacuum from the source of vacuum to the pulsator. The conduit system has a second portion 52 downstream of the pulsator and applying pulsation vacuum to the teat cups. The vacuum in upstream portion 54 is subject to fluctuation due to pulsation vacuum in downstream portion 52.

Present Invention

In the present invention, a vacuum fluctuation suppression filter 90, FIG. 3, is provided in upstream portion 54 of the conduit system and attenuates the noted vacuum fluctuation. The vacuum fluctuation suppression filter is an auxiliary vacuum conduit pipe or line communicating with upstream portion 54 of the conduit system and tuned to attenuate the noted fluctuation. Vacuum conduit pipe 90 has a length and a cross-sectional dimension, such as diameter, calibrated according to frequency of the noted fluctuation, to be described. Pipe 90 is connected to upstream portion 54 of the conduit system at a connection point 92 and is calibrated to have substantially zero impedance at such connection point at the frequency of the noted fluctuation. In preferred form, pipe 90 has a length calibrated to provide the noted substantially zero impedance at connection point 92. Such length is preferably a quarter wavelength of the noted frequency of fluctuation.

Figure 4:
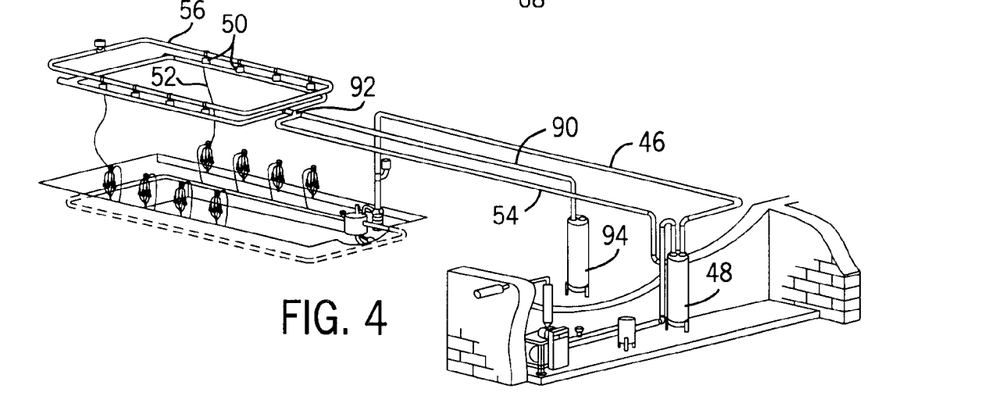
FIG. 4 is like FIG. 3 and shows another embodiment.

In a further embodiment, FIG. 4, auxiliary vacuum conduit or pipe 90 includes a termination tank 94 having a volume calibrated according to the noted frequency of fluctuation, to be described. Such volume is calibrated to provide substantially zero impedance at connection point 92. Termination tank 94 is distally spaced from connection point 92.

Figure 5:
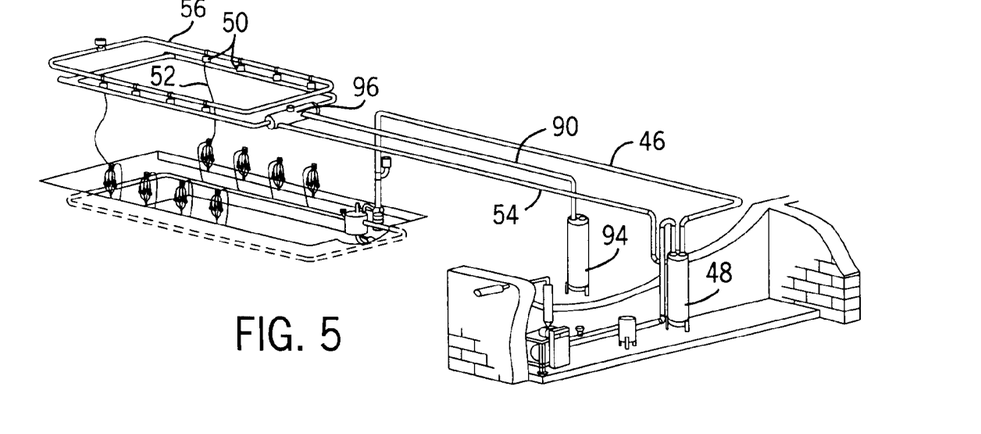
FIG. 5 is like FIG. 4 and shows another embodiment.

In a further embodiment, FIG. 5, vacuum conduit or pipe 90 includes a tank 96 suppressing higher order mode harmonics of the noted frequency. Tank 96 is a connection tank at the noted connection point 92. In the embodiment of FIG. 5, the vacuum conduit includes distally spaced tanks 94 and 96, with tank 94 having a volume calibrated to provide substantially zero impedance at connection point 92, and tank 96 suppressing harmonics of the noted frequency. Tank 94 is a termination tank distally spaced from connection point 92, and tank 96 is a connection tank at connection point 92.

A quarter wave filter can be used to reduce vacuum fluctuation on a vacuum line caused by the pulsation action of the pulsators. The quarter wave filter consists of a pipe (referred to as the filter line) of some material, usually PVC, cut to a certain length and terminated at the end with either a cap or a tank of certain volume. The quarter wave filter is coupled to the vacuum line at a position where the undesired vacuum fluctuation is to be suppressed, usually at the front end of the pulsation line. In addition, this same concept can be incorporated into the initial design of a system, where the pipes used in the system act as filters. The quarter wave filter consists of a pipe of certain length and diameter, referred to as the filter line, that is either terminated with a tank or is capped off, and when properly installed, causes an attenuation of a vacuum signal of certain frequency.

SECTION 1

Inductance, Capacitance and Resistance

In this section the inductance per length and the capacitance per length are defined and derived for a pipe. The equation for the resistance of a line is taken from ISO 5707:1996(E) and restated here.

The term inductance herein does not refer to electrical inductance, but instead to a property of a pipe, that is analogous to the inductance of an electrical transmission line. In some textbooks, this property is referred to as fluid inertia, however this term is not used herein for the reasons noted below.

In electrodynamics theory, the inductance per unit length of a parallel-plate transmission line, that has a width, w, and a distance between plates, d, is $$L = \mu \cdot \frac{d}{w} \tag{1-0}$$

This equation shows that the inductance is a property of the physical dimensions of the transmission line. In like manner, the inductance of a pipe is also only a function of the physical dimensions of the pipe and not a function of mass. Since mass characterizes the inertial property of a body, and since the inductance of a pipe is not a function of mass, the term fluid inertia is not used herein, though such term is noted if to facilitate understanding among those in the fluid dynamics arts.

1-1 Derivation for the Inductance Per Unit Length of a Pipe

The general equation for force in one dimension, as a function of acceleration and a non-changing mass is $$F = M \frac{dv}{dt} \tag{1-1}$$

Figure 6:
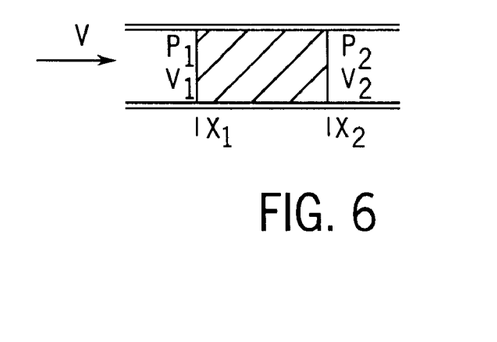
FIG. 6 is a schematic illustration of a column of air with pressure differentials.

This equation describes the force acting on a column of air whose column has velocity v, and total mass M. Please refer to FIG. 6 showing a column of air with pressure differentials $P_1$ and $P_2$.

If the pressure is the same at all points on the plane surface area A, then the following equation holds true.

$$P = \frac{F}{A} \tag{1-2}$$

The net force applied to a column of air whose boundaries are defined by $x_1$ and $x_2$, is equal to the pressure difference, multiplied by the cross sectional area of the pipe.

$$F = A(P_1 - P_2) \tag{1-3}$$

The total mass of the column of air is equal to $$M = \iiint \rho \cdot dV \tag{1-4}$$

If the density of the air column remains relatively constant between $x_1$ and $x_2$ then the total mass of the column equals the average density of the air column, $\rho$, multiplied by the volume of the column of air.

$$M = l \cdot \rho \cdot A \tag{1-5}$$

where l equals the length of the column.

$$l = x_2 - x_1 \tag{1-6}$$

Substituting equations (1-5) and (1-3) into equation (1-1) gives $$A(P_1 - P_2) = l \cdot \rho \cdot A \cdot \frac{dv}{dt} \tag{1-7}$$

If we define the current of air molecules, symbolized by the character I, to be the net mass of air molecules passing through a cross section of area, A, in one second with velocity v and density $\rho$, then $$I = \rho \cdot A \cdot v \tag{1-8}$$

The net current at any point, (or node) along the pipe is therefore equal to the change of air mass with respect to time at that node.

$$I = \frac{dM}{dt} \tag{1-9}$$

If the vacuum line pressure differential, across the column of air, is such that the density of air does not change significantly, then $\rho$ can be held constant. Taking the derivative of equation (1-8) with respect to time gives $$\frac{dI}{dt} = \frac{d(\rho \cdot A \cdot v)}{dt} = \rho \cdot A \cdot \frac{dv}{dt} \tag{1-10}$$

Substituting equation (1-10) into equation (1-7) gives $$A(P_1 - P_2) = l \cdot \frac{dI}{dt} \tag{1-11}$$

or $$(P_1 - P_2) = \frac{l}{A} \cdot \frac{dI}{dt} \tag{1-12}$$

If we define the inductance per unit length of a vacuum line, symbolized by the character L, to be equal to the inverse of the cross sectional area of the pipe then $$L = \frac{1}{A} \tag{1-13}$$

and $$(P_1 - P_2) = l \cdot L \cdot \frac{dI}{dt} \tag{1-14}$$

Equation (1-14) can be modified for vacuum calculations instead of pressure.

$$\Delta V = -l \cdot L \cdot \frac{dI}{dt} \tag{1-15}$$

where $\Delta V$ is equal to $(V_1 - V_2)$.

If length, l, is measured in feet, area, A, in square feet, vacuum in inHg, and current, I, in grams per second then the equation for inductance per foot becomes:

$$L = \frac{9.68832 \times 10^{-7}}{A} \tag{1-16}$$

1-2 Derivation for the Capacitance Per Unit Length of a Pipe

By experiment, at low pressures, the equation of state, of a gas is $$P \cdot V = n \cdot R \cdot T \tag{1-17}$$

where P is the pressure given in Pascals, V is the volume given in cubic meters, n is equal to the number of moles, R is the ideal gas constant equal to 8.314 Joules per mole per degree Kelvin, and T is the temperature in Kelvin.

Rewriting equation (1-17) as a function of molecular weight $M_o$, and total mass M, gives $$P \cdot V = \frac{M}{M_O} \cdot R \cdot T \tag{1-18}$$

Holding the length of the column of air constant in time, along with temperature and taking the derivative of equation (1-18) with respect to time gives, $$V \cdot \frac{dP}{dt} = \frac{R \cdot T}{M_O} \cdot \frac{dM}{dt} \tag{1-19}$$

Rearranging equation (1-19) gives $$\frac{dM}{dt} = \frac{M_O \cdot V}{R \cdot T} \cdot \frac{dP}{dt} \tag{1-20}$$

By definition, according to equation (1-9), equation (1-20) can be rewritten as $$I = \frac{M_O \cdot V}{R \cdot T} \cdot \frac{dP}{dt} \tag{1-21}$$

If we define the capacitance per unit length of a pipe, symbolized as C, to be $$C = \frac{M_O \cdot V}{R \cdot T \cdot l} \tag{1-22}$$

Substituting equation (1-22) into (1-21) gives $$I = l \cdot C \cdot \frac{dP}{dt} \tag{1-23}$$

Equation (1-23) can be modified for vacuum:

$$I = -l \cdot C \cdot \frac{dV}{dt} \tag{1-24}$$

If length l, is measured in feet, area A, in square feet, vacuum in inHg, and current in grams per second then the equation for capacitance per foot becomes:

$$C = A \cdot 1.14 \tag{1-25}$$

From this equation, the capacitance, $C_T$, of a tank of specific volume, given in cubic feet, is $$C_T = \text{Volume} \cdot 1.14 \tag{1-26}$$

1-3 The Resistance Per Length of a Pipe

According to ISO 5707:1996(E), Annex B, the pressure drop, up to 3 kPa, in a pipe is $$\Delta P = 27.8 \cdot l \cdot \frac{q^{1.75}}{d^{4.75}} \tag{1-27}$$

Where $\Delta P$ is the pressure drop in the pipe in kilopascals, l is the length of pipe in meters, q is the flow of air in the pipe in liters/minute of free air, and d is the pipe diameter measured in millimeters.

The resistance of the pipe per length will be symbolized by the letter R and will be defined as $$R = \frac{\Delta P}{I \cdot l} \tag{1-28}$$

SECTION 2

Transmission Line

In this section the equations for a longitudinal wave are derived using the results of Section 1.

2-1 Transmission Line Equations

Figure 7:
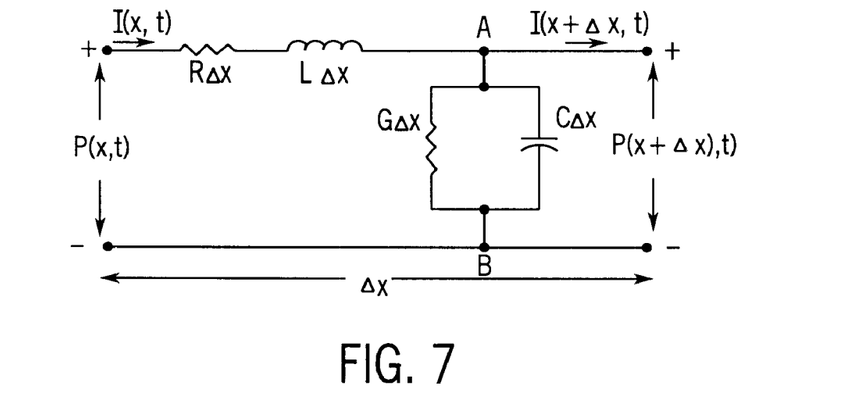
FIG. 7 is a schematic transmission line model.

FIG. 7 is a transmission line model that represents the relevant characteristics of a section of pipe. The conductance per length of a pipe, symbolized by the letter G, represents the ability of the pipe to allow air to leak through its sides (This value is normally zero). Node A, represents the inside of a pipe, which is subjected to a pressure or vacuum, and node B, represents the outside of a pipe, which is subjected to atmospheric pressure. The conductance and resistance of the line will be taken into account at this time. Later, they will be assumed to be zero to represent a loss-less line which is permissive since their values are of small magnitude.

According to equation (1-27), the resistance of a pipe is a function of the current flowing through the pipe. However, in our case, the current does not change dramatically in time and the resistance can be assumed to be constant. Applying the analogue to Kirchoff's voltage law for pressure gives $$\frac{P(x + \Delta x, t) - P(x, t)}{\Delta x} = -\left(R \cdot I(x, t) + L \cdot \frac{\partial I(x, t)}{\partial t}\right) \tag{2-1}$$

and applying Kirchoff's current law to node A in FIG. 7 gives $$\frac{I(x + \Delta x, t) - I(x, t)}{\Delta x} = -\left(G \cdot P(x + \Delta x, t) + C \cdot \frac{\partial P(x + \Delta x, t)}{\partial t}\right) \tag{2-2}$$

In the limit as $\Delta x$ approaches zero, equations (2-1) and (2-2) become $$\frac{\partial P(x, t)}{\partial x} = -\left(R \cdot I(x, t) + L \cdot \frac{\partial I(x, t)}{\partial t}\right) \tag{2-3}$$

$$\frac{\partial I(x, t)}{\partial x} = -\left(G \cdot P(x, t) + C \cdot \frac{\partial P(x, t)}{\partial t}\right) \tag{2-4}$$

From these equations we can obtain the following two equations.

$$\frac{\partial^2 P}{\partial x^2} = R \cdot G \cdot P + (R \cdot C + G \cdot L) \cdot \frac{\partial P}{\partial t} + L \cdot C \cdot \frac{\partial^2 P}{\partial t^2} \tag{2-5}$$

$$\frac{\partial^2 I}{\partial x^2} = R \cdot G \cdot I + (R \cdot C + G \cdot L) \cdot \frac{\partial I}{\partial t} + L \cdot C \cdot \frac{\partial^2 I}{\partial t^2} \tag{2-6}$$

where L, R, C and G are per-unit-length parameters. If L, R, C and G are constant in x and t then equations (2-3) through (2-6) are linear homogeneous equations and superposition applies. That is to say, if $\{P_1, I_1\}$ and $\{P_2, I_2\}$ are individual solutions then $\{a \times P_1 + b \times P_2, a \times I_1 + b \times I_2\}$ is also a solution.

2-2 For a Lossless Transmission Line

The magnitude of the resistance per length is relatively small and the current that leaks through the sides of a pipe is normally zero, therefore R and G can be set to zero and equations (2-3) through (2-6) become the general equations for a lossle transmission line.

$$\frac{\partial P}{\partial x} = -L \cdot \frac{\partial I}{\partial t} \tag{2-7}$$

$$\frac{\partial I}{\partial x} = -C \cdot \frac{\partial P}{\partial t} \tag{2-8}$$

-continued $$\frac{\partial^2 P}{\partial x^2} = L \cdot C \cdot \frac{\partial^2 P}{\partial t^2} \quad (2\text{-}9)$$

$$\frac{\partial^2 I}{\partial x^2} = L \cdot C \cdot \frac{\partial^2 I}{\partial t^2} \quad (2\text{-}10)$$

Equations (2-7) and (2-8) are analogous to the telegraphist's equations in electromagnetic theory where voltage is analogous to pressure and electrical current is analogous to air current. Therefore all relevant equations that can be derived from equations (2-7) through (2-10) apply to this document and can be found in any electrodynamics book. To summarize some of these equations, two solutions of these four differential equations are $$P_i(x,t) = P_A \cdot \cos(\omega \cdot t - \beta \cdot x + \theta_1) \quad (2\text{-}11)$$

which is a wave known as the incident wave, travelling in the positive x direction and $$P_r(x,t) = P_B \cdot \cos(\omega \cdot t + \beta \cdot x + \theta_2) \quad (2\text{-}12)$$

which is a wave known as the reflected wave, travelling in the negative x direction. Two similar equations for the incident and reflected currents are also solutions.

$$I_i(x,t) = \frac{P_A}{Z_o} \cdot \cos(\omega \cdot t - \beta \cdot x + \theta_1) \quad (2\text{-}13)$$

$$I_r(x,t) = -\frac{P_B}{Z_o} \cdot \cos(\omega \cdot t + \beta \cdot x + \theta_1) \quad (2\text{-}14)$$

where the parameter $Z_0$ is known as the characteristic impedance $$Z_o = \sqrt{\frac{L}{C}} \quad (2\text{-}15)$$

The parameter $v_p$ is known as the phase velocity and is defined as $$v_p = \frac{1}{\sqrt{L \cdot C}} \quad (2\text{-}16)$$

The parameter $\beta$ is known as the phase constant and is defined as $$\beta = \frac{2 \cdot \pi}{\lambda} \quad (2\text{-}17)$$

The parameter $\omega$ is known as the angular frequency and is defined as $$\omega = 2 \cdot \pi \cdot f \quad (2\text{-}18)$$

where f is the frequency given in hertz.

Parameters $\omega$, $\beta$, and $v_p$ are related to each other in the following way.

$$\beta = \frac{\omega}{v_p} \quad (2\text{-}19)$$

Since superposition holds, the sum of the incident and reflected pressure waves and current waves are also solutions $$P(x,t) = P_i(x,t) + P_r(x,t) \quad (2\text{-}20)$$

and $$I(x,t) = I_i(x,t) + I_r(x,t) \quad (2\text{-}21)$$

For sinusoidal time varying waves, it is often useful to write (2-20) and (2-21) in phasor form.

$$P = P_1 \cdot e^{-j \cdot \beta \cdot x} + P_2 \cdot e^{j \cdot \beta \cdot x} \quad (2\text{-}22)$$

$$I = \frac{P_1}{Z_0} \cdot e^{-j \cdot \beta \cdot x} - \frac{P_2}{Z_0} \cdot e^{j \cdot \beta \cdot x} \quad (2\text{-}23)$$

where $$P_1 = P_A \cdot e^{j \cdot \theta_1} \quad (2\text{-}24)$$

$$P_i(x,t) = \text{real}(P_1 \cdot e^{-j \cdot \beta \cdot x} \cdot e^{j \cdot \omega \cdot t}) \quad (2\text{-}25)$$

$$P_2 = P_B \cdot e^{j \cdot \theta_2} \quad (2\text{-}26)$$

and $$P_r(x,t) = \text{real}(P_2 \cdot e^{j \cdot \beta \cdot x} \cdot e^{j \cdot \omega \cdot t}) \quad (2\text{-}27)$$

2-3 Change of Coordinates

Figure 8:
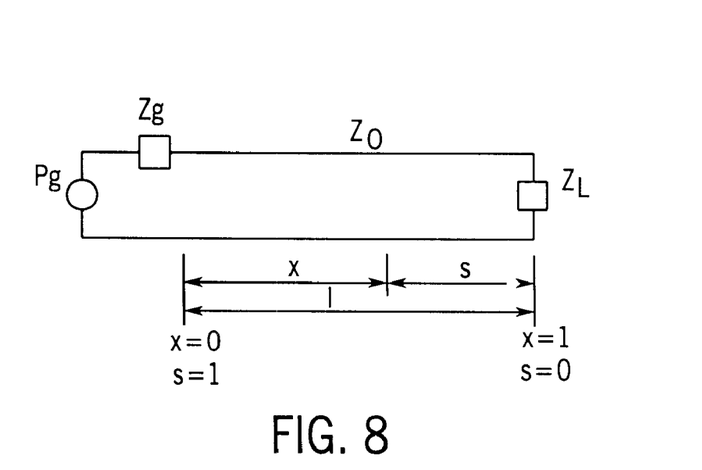
FIG. 8 is a schematic impedance line model.

It is often useful to calculate the impedance of the line relative to the load. Refer to FIG. 8. $P_g$ represents the pulsator signal, $Z_g$ represents the input impedance of the pulsator line, $Z_0$ represents the characteristic impedance of the filter line, $Z_L$ represents the impedance of the load of the filter line and l represents the length of the filter line.

According to FIG. 8

$$x = l - s \quad (2\text{-}28)$$

and equation (2-22) becomes $$P = P_1 \cdot e^{-j \cdot \beta \cdot (l-s)} + P_2 \cdot e^{j \cdot \beta \cdot (l-s)} \quad (2\text{-}29)$$

Let $$P_a = P_1 \cdot e^{-j \cdot \beta \cdot l} \quad (2\text{-}30)$$

and $$P_b = P_2 \cdot e^{j \cdot \beta \cdot l} \quad (2\text{-}31)$$

then equation (2-29) becomes $$P(s) = P_a \cdot e^{j \cdot \beta \cdot s} + P_b \cdot e^{-j \cdot \beta \cdot s} \quad (2\text{-}32)$$

and similarly for the current $$I(s) = \frac{P_a}{Z_0} \cdot e^{j \cdot \beta \cdot s} - \frac{P_b}{Z_0} \cdot e^{-j \cdot \beta \cdot s} \quad (2\text{-}33)$$

The phasor incident and phasor reflected waves will be defined as $$P_i = P_a \cdot e^{j \cdot \beta \cdot s} \quad (2\text{-}34)$$

and $$P_r = P_b \cdot e^{-j \cdot \beta \cdot s} \quad (2\text{-}35)$$

and the phasor form of equations (2-20) and (2-21) become $$P = P_i + P_r \qquad (2\text{-}36)$$

$$I = \frac{P_i}{Z_0} - \frac{P_r}{Z_0} \qquad (2\text{-}37)$$

2-4 Pressure Reflection Coefficient

The pressure reflection coefficient (or just reflection coefficient) is defined as the ratio of the reflected wave over the incident wave at a give position s on the line.

$$\Gamma(s) = \frac{P_r(s)}{P_i(s)} \qquad (2\text{-}38)$$

Substituting equations (2-34) and (2-35) into (2-38) gives $$\Gamma(s) = \frac{P_b}{P_a} \cdot e^{-2 \cdot j \cdot \beta \cdot s} \qquad (2\text{-}39)$$

At the load, s is equal to zero and according to equation (2-34) and (2-35), the incident pressure wave is equal to $P_a$ and the reflected pressure wave is equal to $P_b$. Therefore in accordance with equation (2-38), the reflection coefficient at the load is equal to $$\Gamma_L = \frac{P_b}{P_a} \qquad (2\text{-}40)$$

Substituting equation (2-40) into (2-39) gives $$\Gamma(s) = \Gamma_L e^{-2 \cdot j \cdot \beta \cdot s} \qquad (2\text{-}41)$$

The reflection coefficient at the load, $\Gamma_L$, is a phasor and can be written as $$\Gamma_L = |\Gamma_L| \cdot e^{j \cdot \theta_{\Gamma L}} \qquad (2\text{-}42)$$

where $\theta_{\Gamma L}$ is the phase angle of $\Gamma$ at the load and $|\Gamma_L|$ is equal to the magnitude of $\Gamma$ at the load. Substituting equation (2-42) into (2-41) gives $$\Gamma(s) = |\Gamma_L| \cdot e^{j \cdot (\theta_{\Gamma L} - 2 \cdot \beta \cdot s)} \qquad (2\text{-}43)$$

The reflection coefficient can be written as $$\Gamma(s) = |\Gamma(s)| \cdot e^{j \cdot \theta_\Gamma} \qquad (2\text{-}44)$$

Equations (2-43) and (2-44) show that the magnitude of $\Gamma$ is a constant and is equal to the magnitude of $\Gamma$ at the load.

$$|\Gamma(s)| = |\Gamma_L| \qquad (2\text{-}45)$$

They also show that the phase angle of the reflection coefficient is equal to $$\theta_\Gamma(s) = \theta_{\Gamma L} - 2 \cdot \beta \cdot s \qquad (2\text{-}46)$$

This equation shows that the phase angle of the reflection coefficient becomes more negative as s increases. If $\Gamma$ is plotted on the Smith chart, as s increases, the phasor, $\Gamma$, will rotate clockwise.

The impedance of the pipe as a function of s is defined as $$Z(s) = \frac{P(s)}{I(s)} \qquad (2\text{-}47)$$

Substituting equations (2-32) and (2-33) into (2-47) gives $$Z(s) = Z_0 \cdot \frac{P_a \cdot e^{j \cdot \beta \cdot s} + P_b \cdot e^{-j \cdot \beta \cdot s}}{P_a \cdot e^{j \cdot \beta \cdot s} - P_b \cdot e^{-j \cdot \beta \cdot s}} \qquad (2\text{-}48)$$

or $$Z(s) = Z_0 \cdot \frac{1 + \dfrac{P_b}{P_a} \cdot e^{-2 \cdot j \cdot \beta \cdot s}}{1 - \dfrac{P_b}{P_a} \cdot e^{-2 \cdot j \cdot \beta \cdot s}} \qquad (2\text{-}49)$$

Substituting equation (2-39) into (2-49) gives $$Z(s) = Z_0 \cdot \frac{1 + \Gamma(s)}{1 - \Gamma(s)} \qquad (2\text{-}50)$$

From now on, we shall always measure the distance using parameter s, so equation (2-50) can be written as $$Z = Z_0 \cdot \frac{1 + \Gamma}{1 - \Gamma} \qquad (2\text{-}51)$$

The normalized impedance, symbolized by the letter z, is defined as $$z = \frac{Z}{Z_0} \qquad (2\text{-}52)$$

Therefore equation (2-51) can be rewritten as $$z = \frac{1 + \Gamma}{1 - \Gamma} \qquad (2\text{-}53)$$

From this equation, we can write the reflection coefficient as a function of the normalized impedance $$\Gamma = \frac{z - 1}{z + 1} \qquad (2\text{-}54)$$

2-5 Maximum and Minimum Pressure

Equation (2-32) can be rewritten expressing the pressure wave as $$P(s) = P_a \cdot e^{j \cdot \beta \cdot s} \cdot \left(1 + \frac{P_b}{P_a} \cdot e^{-2 \cdot j \cdot \beta \cdot s}\right) \qquad (2\text{-}55)$$

Substituting equation (2-39) into this equation gives $$P(s) = P_a \cdot e^{j \cdot \beta \cdot s} \cdot (1 + \Gamma(s)) \qquad (2\text{-}56)$$

Expressing $\Gamma$ in phasor form gives $$P(s) = P_a \cdot e^{j \cdot \beta \cdot s} \cdot (1 + |\Gamma(s)| \cdot e^{j \cdot \theta_\Gamma}) \qquad (2\text{-}57)$$

The magnitude of the pressure wave equals $$|P(s)| = |P_a| \cdot |1 + |\Gamma(s)| \cdot e^{j \cdot \theta_\Gamma}| \qquad (2\text{-}58)$$

According to this equation, the maximum pressure occurs when the phase angle of $\Gamma$ is an even integer multiple of $\pi$, and the minimum pressure occurs when the phase angle of $\Gamma$ is an odd integer multiple of $\pi$.

2-6 Maximum and Minimum Impedance

Equation (2-51) states $$Z = Z_0 \cdot \frac{1+\Gamma}{1-\Gamma}$$

From this equation, it can be seen that the maximum impedance occurs when the phase angle of $\Gamma$ is an even integer multiple of $\pi$, and the minimum impedance occurs when the phase angle of $\Gamma$ is an odd integer multiple of $\pi$.

2-7 Smith Chart

The Smith chart can be used to calculate the length of pipe needed to filter the pulsator signal in a vacuum system. It is described next.

The normalized impedance and reflection coefficient can be written as $$z = r + jx \tag{2-59}$$

$$\Gamma = u + jv \tag{2-60}$$

From these two equations there exists a relationship between u, v and r $$\left(u - \frac{r}{1+r}\right)^2 + v^2 = \frac{1}{(1+r)^2} \tag{2-61}$$

This is the equation of a circle having a radius of $1/(1+r)$ and centered at $u=r/(1+r)$ and $v=0$. A relationship between u, v and x also exists.

$$(u-1)^2 + \left(v - \frac{1}{x}\right)^2 = \frac{1}{x^2} \tag{2-62}$$

This is the equation for a circle having a radius of $1/\text{abs}(x)$ and centered at $u=1$ and $v=1/x$. Using equations (2-61) and (2-62), r and x circles can be plotted on the reflection coefficient plane. This graph is known as the Smith chart. The intersection of an r circle with an x circle is a coordinate that represents the normalized load impedance.

The Smith chart can be used to calculate the length of the filter line and the method can be found in an electrodynamics book. In the following section, a procedure for calculating the length of the filter line by use of equations, will be explained.

SECTION 3

Quarter Wave Filter Design

In this section the equations for calculating the length of the filter line are derived and a step by step procedure for the construction of the quarter wave filter is established. The derivation assumes that the load of the filter line is a tank of some volume. To simulate a filter line that is capped off, the volume of the tank is set to a small value.

3-1 Derivation for the Phase Angle of the Reflection Coefficient at the Load To determine the length of the filter line, it is first necessary to determine the phase angle and the magnitude of the pressure reflection coefficient at the load. From equation (2-54), the reflection coefficient at the load is $$\Gamma_L = \frac{z_L - 1}{z_L + 1} \tag{3-1}$$

where $z_L$ equals the normalized impedance of the load. In general, $z_L$ can be written as $$z_L = r_L + jx_L \tag{3-2}$$

Since the filter line will be terminated with a tank, the impedance of the load will be. purely capacitive. Therefore the value of $r_L$ will equal zero and the normalized impedance of the load becomes $$z_L = jx_L \tag{3-3}$$

The parameter $x_L$ is the normalized reactance of the capacitive tank and equals $$x_L = \frac{-1}{\omega \cdot C_T \cdot Z_0} \tag{3-4}$$

where $C_T$ is equal to the capacitance of the tank. Substituting equation (3-3) into (3-1) gives $$\Gamma_L = \frac{jx_L - 1}{jx_L + 1} \tag{3-5}$$

The real part of $\Gamma_L$ will therefore equal $$\text{real}(\Gamma_L) = \frac{x_L^2 - 1}{x_L^2 + 1} \tag{3-6}$$

and the imaginary part of $\Gamma_L$ will equal $$\text{imag}(\Gamma_L) = \frac{2 \cdot x_L}{x_L^2 + 1} \tag{3-7}$$

For the case that the absolute value of $x_L$ is greater than or equal to one, which is the case for small tank volumes, the real part of $\Gamma_L$ will be positive and the imaginary part of $\Gamma_L$ will be negative. In this case the phase angle of $\Gamma_L$ at the load, will be the inverse tangent of the imaginary part of $\Gamma_L$ divided by the real part of $\Gamma_L$. The phasor, $\Gamma$, will be located in the fourth quadrant.

$$\theta_{\Gamma_L} = \tan^{-1}\left(\frac{2 \cdot x_L}{x_L^2 - 1}\right) \tag{3-8}$$

For the case that the absolute value of $x_L$ is less than one, which is the case for large tank volumes, the real part of $\Gamma_L$ will be negative and the imaginary part of $\Gamma_L$ will be negative. In this case the phase angle of $\Gamma_L$ will be the inverse tangent of the imaginary part of $\Gamma_L$ divided by the real part of $\Gamma_L$ minus pi. The phasor, $\Gamma$, will be located in the third quadrant.

$$\theta_{\Gamma_L} = \tan^{-1}\left(\frac{2 \cdot x_L}{x_L^2 - 1}\right) - \pi \tag{3-9}$$

The pressure reflection coefficient, $\Gamma$, will start out with this phase angle, at the position of the tank, due to the capacitance of the tank. As one moves along the filter line, from the tank towards the front end of the filter line, the phase angle of Γ will change from this initial value.

3-2 Derivation for the Magnitude of the Reflection Coefficient at the Load

Since the load impedance is purely reactive, the magnitude of Γ will equal one. This can be seen by squaring equations (3-6) and (3-7), adding them together, and taking the square root of the sum.

3-3 Derivation for the Length of the Filter Line

Now that the phase angle and magnitude of the reflection coefficient is known at the load, it is necessary to determine the length of the filter line so as to cause the impedance at the front end of the filter line to be equal to zero.

According to Section (2-6), the minimum impedance on the filter line occurs when the phase angle of Γ is an odd integer multiple of π. This will now be explained.

At the load of the filter line, the phase angle of Γ equals a negative value given by equation (3-8) or (3-9). As one moves along the filter line, from the tank towards the front end of the filter line, the phase angle of Γ becomes more negative. When the phase angle of Γ is equal to $-\pi$, Γ will equal negative one. According to equation (2-53), when Γ equals negative one, the normalized impedance of the line equals zero.

$$z = \frac{1+\Gamma}{1-\Gamma} \tag{2-53}$$

Therefore to minimize the length of the filter line, the magnitude of Γ should equal one and the phase angle of Γ, at the front end of the filter line, should equal $-\pi$. The derivation for the value of s, that will cause the phase angle of Γ to be equal to $-\pi$, will now be shown.

From equation (2-46) the phase angle of the reflection coefficient is equal to $$\theta_\Gamma = \theta_{\Gamma_L} - 2\cdot\beta\cdot s \tag{2-46}$$

Substituting $-\pi$ for $\theta_\Gamma$ in equation (2-46) and solving for s gives $$s = \frac{\theta_{\Gamma_L} + \pi}{2\cdot\beta} \tag{3-10}$$

This equation can be rewritten by use of equations (2-17), (2-18) and (2-19)

$$s = \frac{v_P\cdot(\theta_{\Gamma_L}+\pi)}{4\cdot\pi\cdot f} \tag{3-11}$$

For the case that the absolute value of $x_L$ is greater than or equal to one, $\theta_{\Gamma_L}$ is calculated by use of equation (3-8) and when substituted into equation (3-11) gives $$LengthOfPipe = \frac{v_P\cdot\left(\tan^{-1}\left(\frac{2\cdot x_L}{x_L^2-1}\right)+\pi\right)}{4\cdot\pi\cdot f} \tag{3-12}$$

For the case that the absolute value of $x_L$ is less than one, $\theta_{\Gamma_L}$ is calculated by use of equation (3-9) and when substituted into equation (3-11) gives $$LengthOfPipe = \frac{v_P\cdot\tan^{-1}\left(\frac{2\cdot x_L}{x_L^2-1}\right)}{4\cdot\pi\cdot f} \tag{3-13}$$

3-4 Quarter Wave Filter Construction Procedure

This is a step by step procedure for the design of a quarter wave filter. The filter is designed specifically to cause a zero impedance point at its connection at a specific frequency.

1. From equation (1-16), calculate the inductance per length of the filter line (the filter line's pipe diameter d is given in inches).

$$L = \frac{9.68832\times 10^{-7}}{\frac{\pi}{4}\cdot\left(\frac{d}{12}\right)^2} \tag{3-14}$$

2. From equation (1-25), calculate the capacitance per length of the filter line.

$$C = 1.14\cdot\frac{\pi}{4}\cdot\left(\frac{d}{12}\right)^2 \tag{3-15}$$

3. From equation (2-15), calculate the characteristic impedance of the filter line.

$$Z_0 = \sqrt{\frac{L}{C}} \tag{3-16}$$

4. From equation (1-26), calculate the capacitance of the tank. (The parameter 'Volume' is the volume of the tank given in gallons)

$$C_T = Volume\cdot 0.1336806\cdot 1.14 \tag{3-17}$$

5. From equation (3-4), calculate the normalized load reactance. This calculation assumes that the load is purely capacitive which is the case when the filter line is connected to a tank. In the case where the filter line is just capped off, the value for $C_T$ can be set to a small value such as 0.01. The frequency, f, given in Hz, is the frequency of the signal that is to be suppressed. As an example, if the pulsators are pulsating at 60 PPM, and if the front and rear pulsators are 180 degrees out of phase, then the frequency will be equal to 2 Hz.

$$x_L = \frac{-1}{2\cdot\pi\cdot f\cdot C_T\cdot Z_0} \tag{3-18}$$

6. From equation (2-16), calculate the phase velocity $$v_p = \frac{1}{\sqrt{L\cdot C}} \tag{3-19}$$

7. From equation (3-12), if the absolute value of $x_L$ is greater than or equal to one then the length of the filter line, in feet, is $$LengthOfPipe = \frac{v_p \cdot \left(\tan^{-1}\left(\frac{2 \cdot x_L}{x_L^2 - 1}\right) + \pi\right)}{4 \cdot \pi \cdot f} \quad (3\text{-}20)$$

Or from equation (3-13), if the absolute value of $x_L$ is less than one then the length of the filter line, in feet, is $$LengthOfPipe = \frac{v_p \cdot \tan^{-1}\left(\frac{2 \cdot x_L}{x_L^2 - 1}\right)}{4 \cdot \pi \cdot f} \quad (3\text{-}21)$$

Here are two sample calculations.

1. If the filter line's pipe diameter is equal to three inches and the filter line is capped off, the length of the filter line will be approximately 119 feet in order to suppress a two Hz signal.

2. If the filter line's pipe diameter is equal to three inches and the filter line is terminated with a forty-gallon tank, the length of the filter line will be approximately 46 feet in order to suppress a two Hz signal.

SECTION 4

Implementation of the Filter

There are several ways to implement the quarter wave filter; here are examples.

4-1 Installation of the Quarter Wave Filter

FIG. 4 is a sketch of a typical vacuum system where the quarter wave filter is connected at the front end of the pulsation line. At a specific frequency, the quarter wave filter's impedance is zero at the point of connection. Therefore if the filter is connected between the pulsation line and the rest of the system, the pulsation signal will be suppressed at this location. This prevents the pulsation signal from propagating out, pass the point of connection, to the rest of the system.

In FIG. 3, the filter line is capped off, rather than terminated with a tank.

FIG. 5 is an example of an installation where the quarter wave filter is connected to a tank, near the pulsation line. This tank acts as a filter to suppress higher harmonic signals.

The final equations derived for calculating the length of the filter line, equations 3-12 and 3-13, used the assumption that the density of air is constant under small pressure differentials involved in vacuum milking systems, and that the resistance of the pipe is equal to zero. These are reasonable assumptions for an ideal filter. In practice, it has been found that once the line length is calculated, the actual length may have to be slightly adjusted empirically to achieve maximum suppression and the noted zero impedance at the connection point. For example, in one application the length of the line was calculated to be 67 feet, whereas it was found that an actual length of 70 feet provided the best suppression. Hence, the calculated lengths are substantially accurate, and quarter wavelength applications include auxiliary vacuum conduit pipes having a length calibrated to substantially a quarter wavelength of the frequency of fluctuation.

It is recognized that various equivalents, alternatives and modifications possible within the scope of the appended claims.

What is claimed is:

1. A milking system comprising a source of vacuum applying vacuum through a conduit system to a plurality of milking clusters, each cluster comprising a plurality of teat cups supplying milk to a claw in response to pulsation vacuum controlled by a pulsator in said conduit system, said conduit system having a fire portion upstream of said pulsator and applying vacuum from said source of vacuum to said pulsator, said conduit system having a second portion downstream of said pulsator and applying pulsation vacuum to said teat cups, the vacuum in said first portion of said conduit system being subject to fluctuation due to said pulsation vacuum in said second portion of said conduit system, a vacuum fluctuation suppression filter in said first portion of said conduit system and tuned to attenuate vacuum fluctuation due to said pulsator, wherein said vacuum fluctuation suppression filter comprises an auxiliary vacuum conduit pipe communicating with said first portion of said conduit system and tuned to attenuate said vacuum fluctuation due to said pulsator, and wherein said auxiliary vacuum conduit pipe has a length calibrated to frequency of said vacuum fluctuation due to said pulsator.

2. A milking system comprising a source of vacuum applying vacuum through a conduit system to a plurality of milking clusters, each dust comprising a plurality of teat cups supplying milk to a claw in response to pulsation vacuum controlled by a pulsator in said conduit system, said conduit system having a first portion upstream of said pulsator and applying vacuum from said source of vacuum to said pulsator, said conduit system having a second portion downstream of said pulsator and applying pulsation vacuum to said teat cups, the vacuum in said first portion of said conduit system being subject to fluctuation due to said pulsation vacuum in said second portion of said conduit system, a vacuum fluctuation suppression filter in said first portion of said conduit system and tuned to attenuate vacuum fluctuation due to said pulsator, wherein said vacuum fluctuation suppression filter comprises an auxiliary vacuum conduit pipe communicating with said first portion of said conduit system and tuned to attenuate said vacuum fluctuation due to said pulsator, and wherein said auxiliary vacuum conduit pipe has a cross-sectional dimension calibrated according to frequency of said vacuum fluctuation due to said pulsator.

3. A milking system comprising a source of vacuum applying vacuum through a conduit system to a plurality of milking clusters, each cluster comprising a plurality of teat cups supplying milk to a claw in response to pulsation vacuum controlled by a pulsator in said conduit system, said conduit system having a first portion upstream of said pulsator and applying vacuum from said source of vacuum to said pulsator, said conduit system having a second portion downstream of said pulsator and applying pulsation vacuum to said teat cups, the vacuum in said first portion of said conduit system being subject to fluctuation due to said pulsation vacuum in said second portion of said conduit system, a vacuum fluctuation suppression filter in said first portion of said conduit system and tuned to attenuate vacuum fluctuation due to said pulsator, wherein said vacuum fluctuation suppression filter comprises an auxiliary vacuum conduit pipe communicating with said first portion of said conduit system and tuned to attenuate said vacuum fluctuation due to said pulsator, and wherein said auxiliary vacuum conduit pipe has a length calibrated according to frequency of said vacuum fluctuation due to said pulsator, and wherein said auxiliary vacuum conduit pipe has a cross-sectional dimension calibrated according to frequency of said vacuum fluctuation due to said pulsator.

4. A milking system comprising a source of vacuum applying vacuum through a conduit system to a plurality of milking clusters, each cluster comprising a plurality of teat cups supplying milk to a claw in response to pulsation vacuum controlled by a pulsator in said conduit system, said conduit system having a first portion upstream of said pulsator and applying vacuum from said source of vacuum to said pulsator, said conduit system having a second portion downstream of said pulsator and applying pulsation vacuum to said teat cups, the vacuum in said first portion of said conduit system being subject to fluctuation due to said pulsation vacuum in said second portion of said conduit system, a vacuum fluctuation suppression filter in said first portion of said conduit system and tuned to attenuate vacuum fluctuation due to said pulsator, wherein said vacuum fluctuation suppression filter comprises an auxiliary vacuum conduit pipe communicating with said first portion of said conduit system and tuned to attenuate said vacuum fluctuation due to said pulsator, and wherein said auxiliary vacuum conduit pipe includes a termination tank having a volume calibrated according to frequency of said vacuum fluctuation due to said pulsator.

5. A milking system comprising a source of vacuum applying vacuum through a conduit system to a plurality of milking clusters, each cluster comprising a plurality of teat cups supplying milk to a claw in response to pulsation vacuum controlled by a pulsator in said conduit system, said conduit system having a first portion upstream of said pulsator and applying vacuum from said source of vacuum to said pulsator, said conduit system having a second portion downstream of said pulsator and applying pulsation vacuum, to said teat cups, the vacuum in said first portion of said conduit system being subject to fluctuation due to said pulsation vacuum in said second portion of said conduit system, a vacuum fluctuation suppression filter in said first portion of said conduit system and tuned to attenuate vacuum fluctuation due to said pulsator, wherein said vacuum fluctuation suppression filter comprises an auxiliary vacuum conduit pipe communicating with said first portion of said conduit system and tuned to attenuate said vacuum fluctuation due to said pulsator, and wherein said auxiliary vacuum conduit pipe is connected to said first portion of said conduit system at a connection point, and wherein said auxiliary vacuum conduit pipe is calibrated to have substantially zero impedance at said connection point at the frequency of said vacuum fluctuation due to said pulsator.

6. The invention according to claim 5 wherein said auxiliary vacuum conduit pipe has a length calibrated to provide said substantially zero impedance at said connection point.

7. The invention according to claim 6 wherein said auxiliary vacuum conduit pipe has a length calibrated to substantially a quarter wavelength of said frequency of said vacuum fluctuation due to said pulsator.

8. The invention according to claim 5 wherein said auxiliary vacuum conduit pipe includes a tank having a volume calibrated to provide said substantially zero impedance at said connection point.

9. The invention according to claim 8 wherein said tank is a termination tank distally spaced from said connection point.

10. The invention according to claim 5 wherein said auxiliary vacuum conduit pipe includes a tank suppressing harmonics of said frequency of said vacuum fluctuation due to said pulsator.

11. The invention according to claim 10 wherein said tank is a connection tank at said connection point.

12. The invention according to claim 5 wherein said auxiliary vacuum conduit pipe includes first and second distally spaced tanks, said first tank having a volume calibrated to provide substantially zero impedance at said connection point said second tank suppressing harmonics of said frequency of said vacuum fluctuation due to said pulsator.

13. The invention according to claim 12 wherein said first tank is a termination tank distally spaced from said connection point, and said second tank is a connection tank at said connection point.

14. A milking system comprising a source of vacuum applying vacuum through a conduit system to a plurality of milking clusters, each cluster comprising a plurality of teat cups supplying milk to a claw in response to pulsation vacuum controlled by a pulsator in said conduit system, said conduit system having a first portion upstream of said pulsator and applying vacuum from said source of vacuum to said pulsator, said conduit system having a second portion downstream of said pulsator and applying pulsation vacuum to said teat cups, the vacuum in said first portion of said conduit system being subject to fluctuation due to said pulsation vacuum in said second portion of said conduit system, a vacuum fluctuation suppression filter in said first portion of said conduit system and tuned to attenuate vacuum fluctuation due to said pulsator, wherein said vacuum fluctuation suppression filter comprises an auxiliary vacuum conduit pipe communicating with said first portion of said conduit system and tuned to attenuate said vacuum fluctuation due to said pulsator, and wherein said auxiliary vacuum conduit pipe has a length calibrated to:

$$LengthOfPipe = \frac{v_p \cdot \left(\tan^{-1}\left(\frac{2 \cdot x_L}{x_L^2 - 1}\right) + \pi\right)}{4 \cdot \pi \cdot f}.$$

15. A milking system comprising a source of vacuum applying vacuum through a conduit system to a plurality of milking clusters, each cluster comprising a plurality of teat cups supplying milk to a claw in response to pulsation vacuum controlled by a pulsator in said conduit system, said conduit system having a first portion upstream of said pulsator and applying vacuum from said source of vacuum to said pulsator, said conduit system having a second portion downstream of said pulsator and applying pulsation vacuum to said teat cups, the vacuum in said first portion of said conduit system being subject to fluctuation due to said pulsation vacuum in said second portion of said conduit system, a vacuum fluctuation suppression filter in said first portion of said conduit system and tuned to attenuate vacuum fluctuation due to said pulsator, wherein said vacuum fluctuation suppression filter comprises an auxiliary vacuum conduit pipe communicating with said first portion of said conduit system and tuned to attenuate said vacuum fluctuation due to said pulsator, and wherein said auxiliary vacuum conduit pipe has a length calibrated according to:

$$LengthOfPipe = \frac{v_p \cdot \tan^{-1}\left(\frac{2 \cdot x_L}{x_L^2 - 1}\right)}{4 \cdot \pi \cdot f}.$$

16. A milking method in a milking system having a source of vacuum applying vacuum through a conduit system to a plurality of milking clusters, each cluster comprising a plurality of teat cups supplying milk to a claw in response to pulsation vacuum controlled by a pulsator in said conduit system, said conduit system having a first portion upstream of said pulsator and applying vacuum from said source of vacuum to said pulsator, said conduit system having a second portion downstream of said pulsator and applying pulsation vacuum to said teat cups, the vacuum in said first portion of said conduit system being subject to fluctuation due to said pulsation vacuum in said second portion of said conduit system, said method comprising attenuating vacuum fluctuation in said first portion of said conduit system by providing a vacuum fluctuation suppression filter in said first portion of said conduit system and tuning said vacuum fluctuation suppression filter to attenuate vacuum fluctuation due to said pulsator, and comprising providing an auxiliary vacuum conduit pipe communicating with said first portion of said conduit system, and tuning said auxiliary vacuum conduit pipe to attenuate said vacuum fluctuation due to said pulsator, and comprising calibrating the length of said auxiliary vacuum conduit pipe according to frequency of said vacuum fluctuation due to said pulsator.

17. A milking method in a milking system having a source of vacuum applying vacuum through a conduit system to a plurality of milking clusters, each cluster comprising a plurality of teat cups supplying milk to a claw in response to pulsation vacuum controlled by a pulsator in said conduit system, said conduit system having a first portion upstream of said pulsator and applying vacuum from said source of vacuum to said pulsator, said conduit system having a second portion downstream of said pulsator and applying pulsation vacuum to said teat cups, the vacuum in said first portion of said conduit system being subject to fluctuation due to said pulsation vacuum in said second portion of said conduit system, said method comprising attenuating vacuum fluctuation in said first portion of said conduit system by providing a vacuum fluctuation suppression filter in said first portion of said conduit system and tuning said vacuum fluctuation suppression filter to attenuate vacuum fluctuation due to said pulsator, and comprising providing an auxiliary vacuum conduit pipe communicating with said first portion of said conduit system, and tuning said auxiliary vacuum conduit pipe to attenuate said vacuum fluctuation due to said pulsator, and comprising calibrating a cross-sectional dimension of said auxiliary vacuum conduit pipe according to frequency of said vacuum fluctuation due to said pulsator.

18. A milking method in a milking system having a source of vacuum applying vacuum through a conduit system to a plurality of milking clusters, each cluster comprising a plurality of teat cups supplying milk to a claw in response to pulsation vacuum controlled by a pulsator in said conduit system, said conduit system having a first portion upstream of said pulsator and applying vacuum from said source vacuum to said pulsator, said conduit system having a second portion downstream of said pulsator and applying pulsation vacuum to said teat cups, the vacuum in said first portion of said conduit system being subject to fluctuation due to said pulsation vacuum in said second portion of said conduit system, said method comprising attenuating vacuum fluctuation in said first portion of said conduit system by providing a vacuum fluctuation suppression filter in said first portion of said conduit system and tuning said vacuum fluctuation suppression filter to attenuate vacuum fluctuation due to said pulsator, and comprising providing an auxiliary vacuum conduit pipe communicating with said first portion of said conduit system, and tuning said auxiliary vacuum conduit pipe to attenuate said vacuum fluctuation due to said pulsator, and comprising calibrating the length of said auxiliary vacuum conduit pipe according to frequency of said vacuum fluctuation due to said pulsator, and comprising calibrating a cross-sectional dimension of said auxiliary vacuum conduit pipe according to frequency of said vacuum fluctuation due to said pulsator.

19. A milking method in a milking system having a source of vacuum applying vacuum through a conduit system to a plurality of milking clusters, each cluster comprising a plurality of teat cups supplying milk to a claw in response to pulsation vacuum controlled by a pulsator in said conduit system, said conduit system having a first portion upstream of said pulsator and applying vacuum from said source of vacuum to said pulsator, said conduit system having a second portion downstream of said pulsator and applying pulsation vacuum to said teat cups, the vacuum in said first portion of said conduit system being subject to fluctuation due to said pulsation vacuum in said second portion of said conduit system, said method comprising attenuating vacuum fluctuation in said first portion of said conduit system by providing a vacuum fluctuation suppression filter in said first portion of said conduit system and tuning said vacuum fluctuation suppression filter to attenuate vacuum fluctuation due to said pulsator, and comprising providing an auxiliary vacuum conduit pipe communicating with said first portion of said conduit system, and tuning said auxiliary vacuum conduit pipe to attenuate said vacuum fluctuation due to said pulsator, and comprising providing a termination tank as part of said auxiliary vacuum conduit pipe, and calibrating the volume of said termination tank according to frequency of said vacuum fluctuation due to said pulsator.

20. A milking method in a milking system having a source of vacuum applying vacuum through a conduit system to a plurality of milking clusters, each cluster comprising a plurality of teat cups supplying milk to a claw in response to pulsation vacuum controlled by a pulsator in said conduit system, said conduit system having a first portion upstream of said pulsator and applying vacuum from said source of vacuum to said pulsator, said conduit system having a second portion downstream of said pulsator and applying pulsation vacuum to said teat cups, the vacuum in said first portion of said conduit system being subject to fluctuation due to said pulsation vacuum in said second portion of said conduit system, said method comprising attenuating vacuum fluctuation in said first portion of said conduit system by providing a vacuum fluctuation suppression filter in said first portion of said conduit system and tuning said vacuum fluctuation suppression filter to attenuate vacuum fluctuation due to said pulsator, and comprising providing an auxiliary vacuum conduit pipe communicating with said first portion of said conduit system, and tuning said auxiliary vacuum conduit pipe to attenuate said vacuum fluctuation due to said pulsator, and comprising connecting said auxiliary vacuum conduit pipe to said conduit system at a connection point, and calibrating said auxiliary vacuum conduit pipe to have substantially zero impedance at said connection point at the frequency of said vacuum fluctuation due to said pulsator.

21. The method according to claim 20 comprising calibrating the length of said auxiliary vacuum conduit pipe to provide said substantially impedance at said second point.

22. The method according to claim 21 comprising calibrating the length of said auxiliary vacuum conduit pipe to substantially a quarter wavelength of said frequency of said vacuum fluctuation due to said pulsator.

23. The method according to claim 20 comprising providing said auxiliary vacuum conduit pipe with a tank, and calibrating the volume of said tank to provide said substantially zero impedance at said connection point.

24. The method according to claim 23 comprising providing said tank as a termination tank, and distally spacing said termination tank from said connection point.

25. The method according to claim 20 comprising providing said auxiliary vacuum conduit pipe with a tank, and suppressing harmonics of said frequency of said vacuum fluctuation due to said pulsator with said tank.

26. The method according to claim 25 comprising providing said tank as connection tank at said connection point.

27. The method according to claim 20 comprising providing said auxiliary vacuum conduit pipe with first and second distally spaced tanks, calibrating the volume of said first tank to provide substantially zero impedance at said connection point, and utilizing said second tank to suppress harmonics of said frequency of said vacuum fluctuation due to said pulsator.

28. The method according to claim 27 comprising providing said first tank as a termination tank and distally spacing said first tank from said connection point, and providing said second tank as a connection tank at said connection point.

29. A milking method in a milking system having a source of vacuum applying vacuum through a conduit system to a plurality of milking clusters, each cluster comprising a plurality of teat cups supplying milk to a claw in response to pulsation vacuum controlled by a pulsator in said conduit system, said conduit system having a first portion upstream of said pulsator and applying vacuum from said source of vacuum to said pulsator, said conduit system having a second portion downstream of said pulsator and applying pulsation vacuum to said teat cups, the vacuum in said first portion of said conduit system being subject to fluctuation due to said pulsation vacuum in said second portion of said conduit system, said method comprising attenuating vacuum fluctuation in said first portion of said conduit system by providing a vacuum fluctuation suppression filter in said first portion of said conduit system and tuning said vacuum fluctuation suppression filter to attenuate vacuum fluctuation due to said pulsator, and comprising providing an auxiliary vacuum conduit pipe communicating with said first portion of said conduit system, and tuning said auxiliary vacuum conduit pipe to attenuate said vacuum fluctuation due to said pulsator, and comprising calibrating the length of said auxiliary vacuum conduit pipe according to:

$$LengthOfPipe = \frac{v_p \cdot \left( \tan^{-1}\left( \frac{2 \cdot x_L}{x_L^2 - 1} \right) + \pi \right)}{4 \cdot \pi \cdot f}.$$

30. A milking method in a milking system having a source of vacuum applying vacuum through a conduit system to a plurality of milking clusters, each cluster comprising a plurality of teat cups supplying milk to a claw in response to pulsation vacuum controlled by a pulsator in said conduit system, said conduit system having a first portion upstream of said pulsator and applying vacuum from said source of vacuum to said pulsator, said conduit system having a second portion downstream of said pulsator and applying pulsation vacuum to said teat cups, the vacuum in said first portion of said conduit system being subject to fluctuation due to said pulsation vacuum in said second portion of said conduit system, said method comprising attenuating vacuum fluctuation in said first portion of said conduit system by providing a vacuum fluctuation suppression filter in said first portion of said conduit system and tuning said vacuum fluctuation suppression filter to attenuate vacuum fluctuation due to said pulsator, and providing an auxiliary vacuum conduit pipe communicating with said first portion of said conduit system, and tuning said auxiliary vacuum conduit pipe to attenuate said vacuum fluctuation due to said pulsator, and comprising calibrating the length of said auxiliary vacuum conduit pipe according to:

$$LengthOfPipe = \frac{v_p \cdot \tan^{-1}\left( \frac{2 \cdot x_L}{x_L^2 - 1} \right)}{4 \cdot \pi \cdot f}.$$

* * * * *